United States Patent
Strandjord et al.

(10) Patent No.: US 9,115,994 B2
(45) Date of Patent: Aug. 25, 2015

(54) SYSTEMS AND METHODS SIDEBAND HETERODYNING DETECTION

(71) Applicant: Honeywell International Inc., Morristown, NJ (US)

(72) Inventors: Lee K. Strandjord, Tonka Bay, MN (US); Mary K. Salit, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 14 days.

(21) Appl. No.: 13/916,680

(22) Filed: Jun. 13, 2013

(65) Prior Publication Data

US 2014/0369699 A1 Dec. 18, 2014

(51) Int. Cl.
*G01C 19/72* (2006.01)
*H04B 10/548* (2013.01)

(52) U.S. Cl.
CPC ............ *G01C 19/726* (2013.01); *G01C 19/721* (2013.01); *G01C 19/723* (2013.01); *H04B 10/548* (2013.01)

(58) Field of Classification Search
CPC .. H04B 10/548; H04B 10/64; H04B 10/5165; G01C 19/72; G01C 19/727; G01C 19/726
See application file for complete search history.

(56) References Cited

U.S. PATENT DOCUMENTS

| | | | |
|---|---|---|---|
| 4,720,193 A * | 1/1988 | Miura | 356/460 |
| 4,863,272 A * | 9/1989 | Coccoli | 356/461 |
| 5,141,315 A * | 8/1992 | Malvern | 356/464 |
| 5,289,257 A * | 2/1994 | Kurokawa et al. | 356/463 |
| 5,305,087 A * | 4/1994 | Bernard et al. | 356/461 |
| 5,420,684 A | 5/1995 | Carroll | |
| 5,448,353 A * | 9/1995 | Malvern | 356/461 |
| 8,144,334 B2 | 3/2012 | Chinn et al. | |
| 8,213,019 B2 | 7/2012 | Strandjord et al. | |
| 2012/0307253 A1* | 12/2012 | Sanders et al. | 356/461 |

OTHER PUBLICATIONS

European Patent Office, "European Search Report from EP Application No. 14162904.8 mailed Dec. 2, 2014", "From Foreign Counterpart of EP Application No. 13/916,680", Dec. 2, 2014, pp. 14, Published in: EP.

(Continued)

*Primary Examiner* — Michael A Lyons
*Assistant Examiner* — Maurice Smith
(74) *Attorney, Agent, or Firm* — Fogg & Powers LLC

(57) ABSTRACT

Systems and methods for sideband heterodyning detection are provided. In certain embodiments a system includes an optical resonator configured to allow light to resonate therein; at least one light source that is controlled to form multiple optical fields, wherein each field is phase or frequency modulated at a common modulation frequency and is at a different frequency. The system also comprises multiple heterodyne modulators that phase or frequency modulate a respective field in the multiple fields at a respective heterodyne frequency to form multiple sidebands, wherein the corresponding heterodyne frequency is different for each heterodyne modulator; at least one coupler that couples the multiple sidebands into the optical resonator; and a feedback control that is configured to detect the multiple sidebands transmitted out of the resonator to create multiple detected sideband signals and adjust frequencies of the plurality of fields based on the multiple detected sideband signals.

20 Claims, 8 Drawing Sheets

(56) References Cited

OTHER PUBLICATIONS

European Patent Office, "Office Action from EP Application No. 14162904.8 mailed Apr. 21, 2015", "from Foreign Counterpart of U.S. Appl. No. 13/916,680", Apr. 21, 2015, pp. 113, Published in: EP.

Strandjord et al, "Laser With Transmission and Reflection Mode Feedback Control", "U.S. Appl. No. 13/571,887; H0034385-5704", Aug. 10, 2012, pp. 1-47.

Qiu et al., "RFOG With Optical Heterodyning for Optical Signal Discrimination", "U.S. Appl. No. 13/751,833; H0036596-5704", Jan. 28, 2013, pp. 1-50.

\* cited by examiner

SYSTEMS AND METHODS SIDEBAND HETERODYNING DETECTION

GOVERNMENT LICENSE RIGHTS

This invention was made with Government support under contract number HR0011-08-C-0019 awarded by DARPA. The Government has certain rights in the invention.

BACKGROUND

Gyroscopes (also referred to herein as gyros) have been used to measure rotation rates or changes in angular velocity about an axis of rotation. A basic conventional fiber-optic gyro (FOG) includes a light source, a beam-generating device, and a coil of optical fiber coupled to the beam generating device that encircles an area. The beam-generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different path lengths while propagating around a rotating closed optical path, and the difference in the two path lengths is proportional to the rotational rate that is normal to the enclosed area.

In a conventional resonator FOG (RFOG), the counter-propagating light beams are typically monochromatic (e.g., in a single frequency) and circulate through multiple turns of the fiber-optic coil and for multiple passes through the coil using a device, such as a fiber coupler, that redirects light that has passed through the coil back into the coil again. The beam-generating device modulates and/or shifts the frequencies of each of the counter-propagating light beams so that the resonance frequencies of the resonant coil may be observed. The resonance frequencies for each of the CW and CCW paths through the coil are based on a constructive interference condition such that all light-waves having traversed the coil a different number of times interfere constructively at any point in the coil. As a result of this constructive interference, an optical wave having a wavelength λ is referred to as "on resonance" when the round trip resonator optical path length is equal to an integral number of wavelengths. A rotation about the axis of the coil produces a different effective path length for clockwise and counterclockwise propagation, thus producing a shift between the respective resonance frequencies of the resonator. The frequency difference, such as may be measured by tuning the CW beam and CCW beam frequencies to match the resonance frequency shift of the closed optical path due to rotation, indicates the rotation rate.

However, the modulation of the light beam also has imperfections that can result in rotation rate bias errors. One type of imperfection is modulator intensity modulation. Even though the intended modulation is either on cavity length, optical frequency or optical phase, a non-ideal modulator may also generate a modulation of the light intensity which can have a component at the modulation frequency. The unwanted intensity modulation will be detected by the demodulator and interpreted as a signal indicating an off resonance condition. Resonance tracking electronics will then move the laser frequency away from the resonance frequency until the normal resonator intensity signal exactly cancels out the unwanted intensity signal. The deviation away from the resonance frequency results in a rotation sensing error if the unwanted intensity signals are different between the two counter-propagating light waves.

Another modulator imperfection that can result in rotation-sensing errors is modulation distortion. Modulation distortion can occur at the modulator drive electronics or the modulator. An ideal modulation is a sinusoidal modulation at a single frequency. However, distortion can result in the generation of higher harmonics on the modulation. Even harmonic modulation will result in a resonance detection error which can lead to a rotation sensing error.

Another source of rotation sensing error is laser phase noise occurring at frequencies above the resonance tracking modulation frequencies. Laser phase noise at twice the resonance tracking modulation frequency and other higher frequency bands will be converted to relative intensity noise by the gyro resonator and frequency down-converted to the same frequency as the resonance detection signal, and therefore eventually becomes a random rotation sensing error. Some methods to reduce this type of error to acceptable levels are to employ lasers with very low phase noise and optical filtering. But this can lead to significant cost increase of the product and reduce product operational robustness.

If the phase modulation is applied to both beams in common, then the modulation imperfections are commonly shared between the CW and CCW light beams and the modulation imperfections can be subtracted out during signal processing of gyro rate signals. However, common modulation can result in other rate bias errors that are associated with optical backscattering. Two techniques for suppressing optical backscattering include using intensity modulation to encode the various laser beams with a unique signature and balanced heterodyne detection at the resonator output to allow the separation of various detected beams in the signal processing. However, the use of intensity modulation includes intensity modulators that introduce significant optical losses that result in a degradation in angle random walk performance. Also, the use of balanced heterodyne detection includes extra optics and complex signal processing and control.

Another benefit of common resonance tracking modulation is that the random error generated by common laser phase noise at frequencies above the modulation frequency will subtract out during signal processing of gyro rate signals. The rejection of common mode laser phase noise can allow the use of lower cost, higher phase noise lasers and can eliminate the need for optical filtering, which can result in a significant reduction in product cost and greatly improve the product's operational robustness.

SUMMARY

Systems and methods for sideband heterodyning detection are provided. In certain embodiments a system includes an optical resonator configured to allow light to resonate therein; at least one light source, wherein the light from the at least one light source is controlled to form a plurality of optical fields, wherein each field in the plurality of fields is phase or frequency modulated at a common modulation frequency and each field in the plurality of fields is at a different frequency. The system also comprises a plurality of heterodyne modulators, wherein each heterodyne modulator in the plurality of heterodyne modulators phase or frequency modulates a respective field in the plurality of fields at a respective heterodyne frequency to form a plurality of sidebands, wherein the corresponding heterodyne frequency is different for each heterodyne modulator in the plurality of heterodyne modulators. Further, the system includes at least one coupler configured to couple the plurality of sidebands into the optical resonator; and a feedback control coupled to the resonator, wherein the feedback control is configured to detect the plurality of sidebands transmitted out of the resonator to create a plurality of detected sideband signals and adjust frequencies of the plurality of fields based on the plurality of detected sideband signals.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
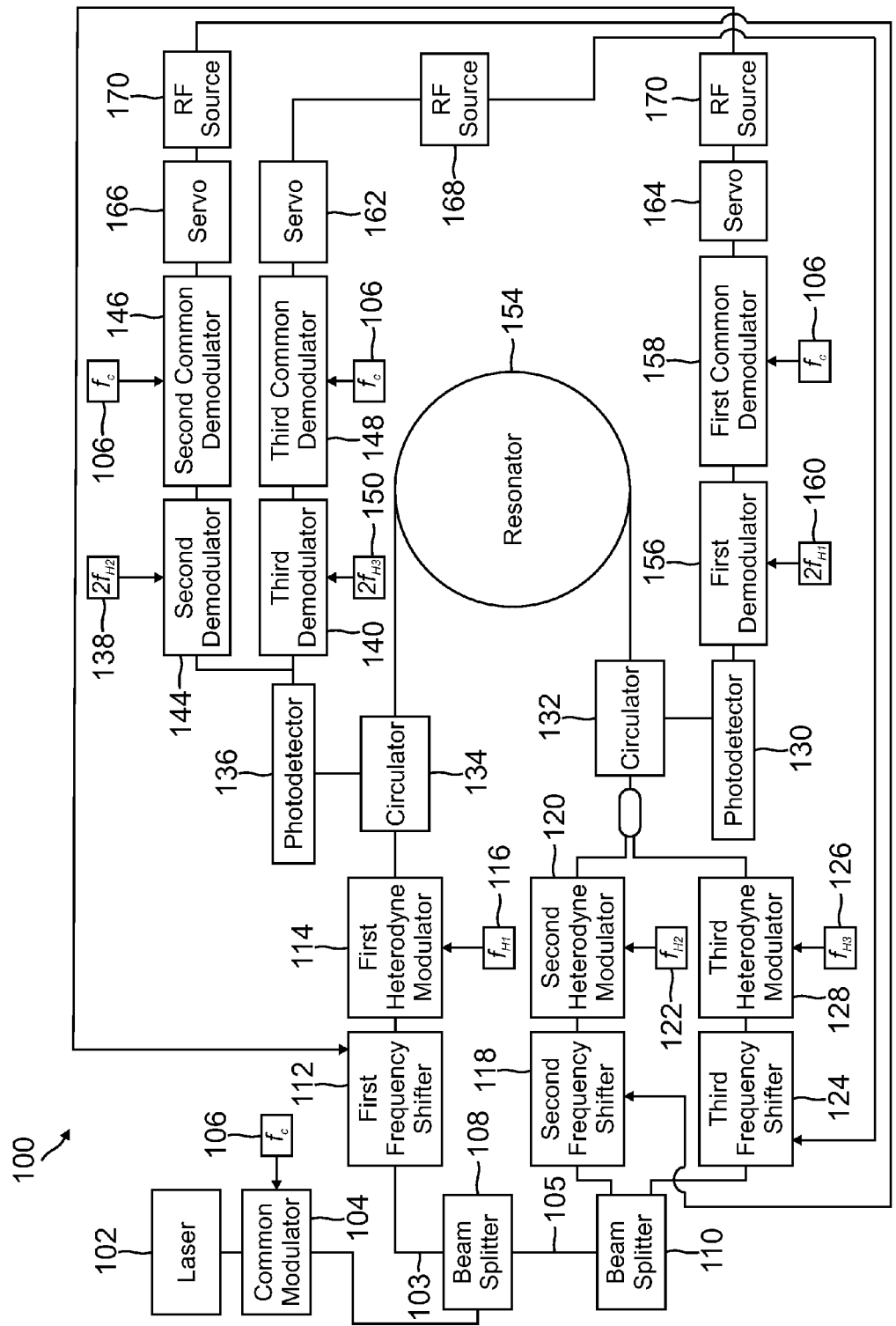
FIG. 1A is a block diagram of a system that employs sideband heterodyne detection in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

To separate the various detected beams in the signal processing, embodiments of a resonator fiber optic gyroscope (RFOG) implementing a method called sideband heterodyne detection are described herein. As described herein, a phase or frequency modulation is applied at a unique frequency to each laser beam that is used to measure the resonance frequencies of an RFOG resonant coil. The modulation of each laser beam at a unique frequency can facilitate the discrimination of the different laser beams from one another during signal processing based on the sidebands of each laser beam. In at least one implementation, the use of sideband heterodyne detection is implemented without using additional optics and/or complex control schemes.

FIG. 1 is a block diagram of a system 100 that implements sideband heterodyne detection (SHD) to discriminate between different laser fields that propagate within a resonator 154. In the system 100, as illustrated, three different laser fields propagate within the resonator 154. For example, in at least one implementation, the three different laser frequencies are produced by a single laser source such as laser 102. In certain embodiments, where the system 100 is part of a gyroscope, the different laser fields with differing frequencies are used to measure rotation rates or changes in angular velocity about an axis of rotation. As the laser fields propagate within the resonator 154, the laser fields propagate in either a clockwise (CW) direction or a counter-clockwise (CCW) direction along the core of the optical fiber in the resonator 154. As the system 100 rotates, the two counter-propagating (e.g., CW and CCW) laser fields experience different effective path lengths while propagating around the resonator 154 due to the Sagnac effect. The difference in effective path lengths between the clockwise and counterclockwise propagation produces a difference in the respective resonance frequencies of the resonator. The difference in the frequencies may be measured by tuning the CW-propagating and CCW-propagating field frequencies to match the respective resonance frequencies of the resonator 154 during rotation. The measured difference indicates the rotation rate of the system 100.

For example, the system 100 may be a gyroscope such as an RFOG. When the system 100 is an RFOG, the system 100 may be used as part of a navigation system, a platform stabilization system, a pointing system, and the like. For example, in some implementations, the system 100 is implemented as part of an inertial sensor unit that includes one or more RFOGs and one or more linear accelerometers. The system 100 measures rotation rate and outputs a signal that indicates the rotation rate to an external component like a processor or other device, where the external component uses the measured rotation rate from the system 100 to calculate parameters such as position, orientation, and angular velocity.

As shown, system 100 includes three laser frequencies that are produced from a laser 102. Alternatively, the system 100 may include any multiple numbers of different laser fields. The laser 102 produces a monochromatic optical field at a particular frequency. In certain implementations, the laser 102 is modulated by a common modulator 104 at a common modulation frequency 106 (represented as k in FIG. 1). By modulating the light produced by the laser 102, the modulation source affects all the separate laser fields that propagate through the resonator 154 such that the fields are modulated at a common modulation frequency and the imperfections in the modulation are also applied in common to all of the fields. The common modulation frequency 106 may be used as the resonance tracking modulation frequency for each optical field traveling through the resonator 154. Common modulation is a type of modulation that uses a common resonance tracking modulation frequency signal (such ask) for all optical fields that travel through the resonator. For example, this can be done by using the same modulator for counter-propagating light waves that propagate within the resonator 154. Because they are modulated by the same using the same modulation source, the resonance detection errors due to modulation imperfections are the same for both the clockwise and counterclockwise resonance frequencies, and common errors will cancel out in the rotation measurement. Furthermore, by using the same resonance tracking modulation frequency, random rotation errors due to laser phase noise at frequencies above the modulation frequency are also common mode and will cancel out in the rotation measurement. Embodiments described herein use common modulation to reduce or eliminate rotation sensing errors due to modulator imperfections and common laser phase noise. In an alternative implementation, the common modulator 104 includes a number of separate modulators that each modulate an associated individual optical field at the common modulation frequency 106, where the individual fields propagate within the resonator 154.

As shown in FIG. 1A, to separate the light produced by laser 102 into separate laser fields distinguishable by frequency, propagation direction, spatial separation, etc a beam splitter 108 splits a portion of the laser light into a CCW branch 105 of the system 100 and a portion of the light into a CW branch 103 of the system 100. The portion of the light that was split into the CW branch 103 of the system 100 becomes the first field that will propagate around the resonator 154 in a clockwise direction. The portion of the light that was split into the CCW branch 105 of the system 100 is then split into two separate branches by a beam splitter 110 to form a second field and a third field. Both the second field and the third field propagate around the resonator 154 in a counter-clockwise direction.

Figure 1B:
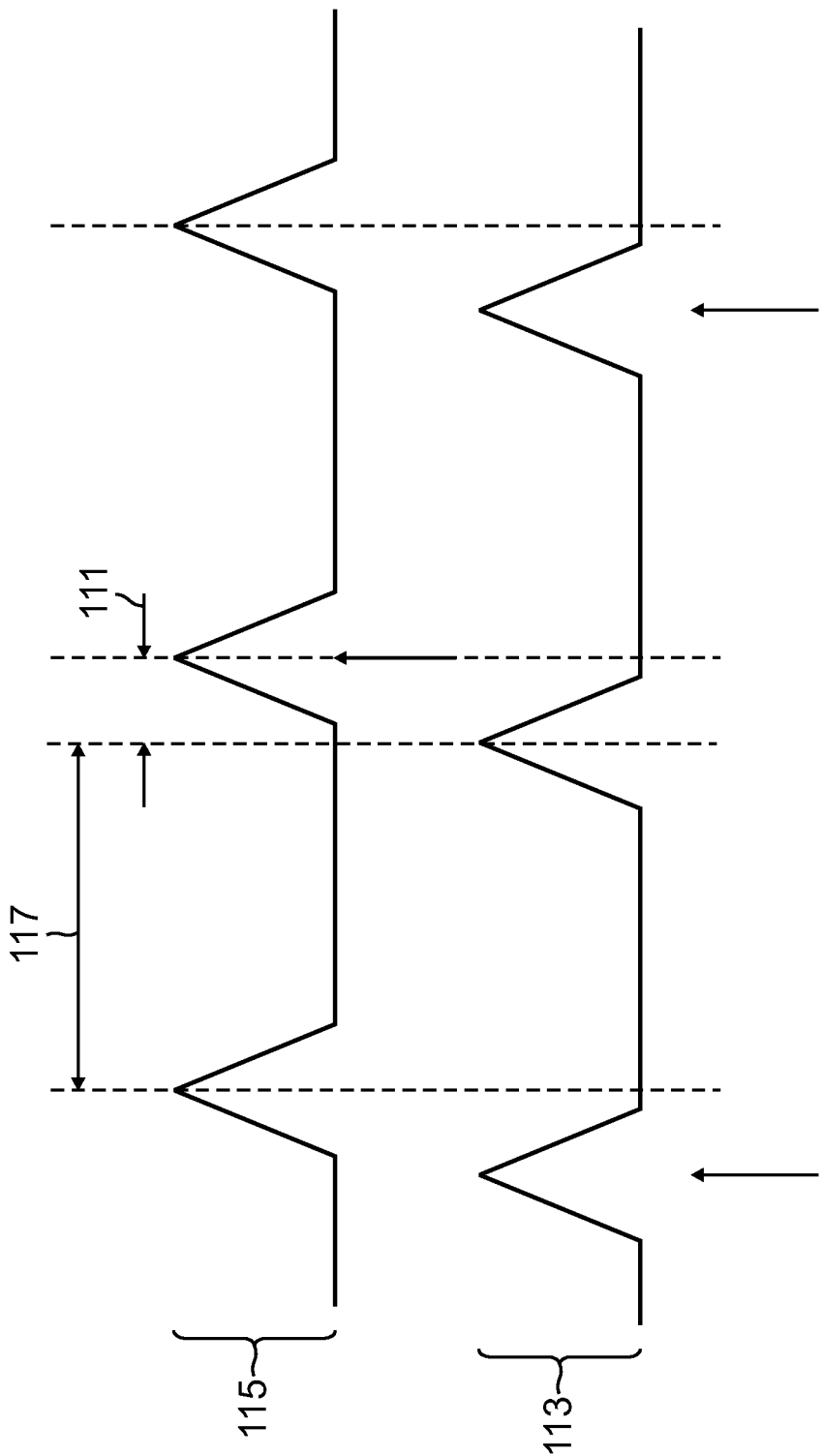
FIG. 1B is a diagram illustrating the different frequency signals that are propagated through a resonator in one embodiment described in the present disclosure.

FIG. 1B illustrates a prior art implementation, where different frequencies are propagated within the resonator 154 of FIG. 1A. As shown in FIG. 1B, to sense the rate of rotation about an axis, the system 100 detects the separation 111 between the clockwise resonance frequencies 115 and counter-clockwise resonance frequencies 113 of resonator 154. In FIG. 1A, the system 100 uses resonance detection electronics and servos 162, 164, and 166 to control the optical frequency of each laser beam to be at a resonance of resonator 154. To eliminate rotation sensing errors due to the interference of two different fields, or the interference between one primary field and the back-reflection or backscatter of another field, the system 100 shifts the frequency of each field to a frequency that is different from the frequency of the other fields. In this way, the rotation error is frequency shifted to a frequency equal to the frequency difference between the optical frequencies of the fields. In at least one implementation, the system 100 shifts the optical frequency of each field so that each frequency is at least a free spectral range 117 in FIG. 1B from other frequency, where a free spectral range is equal to the difference between adjacent resonant frequencies in the resonator 154. In certain implementations, as the free spectral range of the resonator 154 depends on the optical length of the resonator loop, the free spectral range can change as the optical length of the resonator 154 changes. For example, certain environmental effects can cause the free spectral range 117 to change, such as temperature.

To shift the frequencies of the different fields to the different frequencies, the system 100 includes a separate frequency shifter associated with each field. The system 100 includes a first frequency shifter 112 for shifting the frequency of the first field in the CW branch 103 to a first frequency. The system 100 also includes a second frequency shifter 118 and a third frequency shifter 124 for shifting the frequencies of the fields in the CCW branch 105 to different frequencies. For example, the second frequency shifter 118 shifts the second field to a second frequency and the third frequency shifter 124 shifts the third field to a third frequency. As illustrated in FIG. 1B, a first frequency 119, a second frequency 121, and a third frequency 123 are all different from one another and in a prior implementation the different resonant frequencies are all separated by a free spectral range of the resonator 154. Common modulation of the optical frequency or phase of each laser beam is used to provide an error signal that indicates when the optical frequency of a beam has deviated away from a resonance of resonator 154. Common modulation produces a resonator output signal at photodetectors 130 and 136. The resonator output signal will have a component at the modulation frequency that can be used as an error signal to detect when the corresponding laser beam is on resonance. The amplitude of the error signal at the modulation frequency will be zero when the laser beam frequency is on resonance. If the laser field frequency deviates from resonance, the amplitude of the error signal will be non-zero and will have a sign that depends on the direction of deviation from resonance. The error signal at the modulation frequency is demodulated down to DC by mixing with a reference signal at the modulation frequency. The DC error signal is then used by a servo to control the frequency of the beam. However, because the resonance detection modulation frequency is common for all three fields, a method must be employed to distinguish the error signal associated with each field. To distinguish the resonance detection error signals of each field, the system includes multiple phase modulators (referred to as heterodyne modulators) that phase modulate each field at a different modulation frequency such that each field has corresponding sidebands at different locations in the frequency spectrum. The frequencies of the phase modulations are referred to as the heterodyne modulation frequencies. The heterodyne modulation frequencies are high enough such that the first order modulation sidebands on the light are separated from each other by at least an order of a resonator free spectral range. The laser frequency can be tuned to either place the laser carrier and even sidebands on resonance, or place the odd sidebands on resonance. If the odd sidebands are placed on resonance the carrier and even sidebands will be off resonance. For example, the first field, after being frequency shifted by the first frequency shifter 112, is phase modulated by a first heterodyne modulator 114, which phase modulates the field at a first heterodyne frequency 116 represented as $f_{H1}$. The second field, after being frequency shifted by the second frequency shifter 118, is phase modulated by a second heterodyne modulator 120, which phase modulates the field at a second heterodyne frequency 122, herein represented as $f_{H2}$. The third field, after being frequency shifted by the third frequency shifter 124, is phase modulated by a third heterodyne modulator 128, which phase modulates the field at a third heterodyne frequency 126, herein represented as $f_{H3}$.

In at least one exemplary implementation, the heterodyne modulation frequencies 116, 122, and 126 are set to be substantially equal to odd multiples of half of the free spectral range of the resonator 154. When the fields are modulated at the heterodyne modulation frequencies 116, 122, and 126, where the carrier of the fields have a frequency located at the middle frequency between two resonant modes of the resonator 154, the modulation of the fields produces sideband signals, where the first harmonic sidebands are located on resonant peaks of the resonator 154. When the fields are modulated at the heterodyne modulation frequencies, the sideband signals produced by the modulation are propagated around the resonator 154 in opposite directions. For example, the sidebands of the first field passes through a circulator 134, whereupon, the sidebands of the first field are propagated into the resonator 154. Within the resonator 154, the sidebands associated with the first field propagate around the resonator 154 in a clockwise (CW) direction. In a similar fashion, the sidebands of the second field and the side bands of the third field are combined into a single channel and then pass through circulator 132. The combined sidebands of the second and third fields are then propagated from the circulator 132 into the resonator 154. As illustrated, the sidebands of the second and third fields propagate around the resonator 154 in a counterclockwise (CCW) direction.

In at least one embodiment, when the sideband signals that propagate in the clockwise direction are received by the circulator 132, the circulator 132 passes the clockwise sideband signals 154 to photodetector 130. Because the sideband signals associated with the first field propagate in the CW direction, the first sideband signals are received by the photodetector 130. The photodetector 130 detects the optical beat note generated by the interference between the first sideband signals and passes electrical signals representing the beat note between the first sideband signals to the first demodulator 156. Since the frequency separation between the first sideband signals is at twice the heterodyne modulation frequency, the beat note between the first sidebands will be at twice the heterodyne modulation frequency. The first demodulator 156 demodulates the first sideband signals at a first demodulation frequency 160. In at least one exemplary implementation, the first demodulation frequency 160 is two times the first heterodyne frequency 116. In a similar manner, when the sideband signals that propagate in the CCW direction are received by the circulator 134, the circulator 134 passes the CCW sideband signals 154 to photodetector 136. Because the sideband signals associated with the second field and the third field propagate in the CCW direction, the second sideband signals and the third sideband signals are received by the photodetector 136. The photodetector 136 passes electrical signals associated with detected light to both the second demodulator 144 and the third demodulator 140. The second demodulator 144 and third demodulator 140 each demodulate both the second and third sideband signals. For example, the second demodulator 144 demodulates both the second and third sideband signals at a second demodulation frequency 138, where the second demodulation frequency 138 is at a frequency of twice the second heterodyne frequency 122 ($2f_{H2}$). Likewise, the third demodulator 140 demodulates both the second and third sideband signals at a third demodulation frequency 150, where the third demodulation frequency 150 is at a frequency of twice the third heterodyne frequency 126 or $2f_{H3}$. By demodulating the second and third signals by the second demodulation frequency 138 and the third demodulation frequency 150, the system 100 is able to discriminate the second sideband signals from the third sideband signals. The demodulated signals are filtered and demodulated by a different common demodulator that demodulates all three signals at the common modulation frequency 106. For example, a first common demodulator 158 demodulates the signals that were produced by the first demodulator 156 at the common modulation frequency 106. Likewise, a second common demodulator 146 demodulates the signals that are produced by the second demodulator at the common modulation frequency 106 and the third common demodulator 148 demodulates the signals that are produced by the third demodulator at the common modulation frequency 106. The signals produced by the first common demodulator 158, the second common demodulator 146, and the third common demodulator 148 are used to adjust the frequencies of the different fields that propagate within the resonator 154. The system 100 demodulates all the signals by the common modulation frequency 106 to determine a resonance detection error that is used for locking the sideband signals to the resonance frequencies of the resonator.

In one implementation, the sidebands may be subject to intensity modulation errors, such that the amplitude of one sideband may be different from the amplitude of the corresponding sideband of the same order. Intensity modulation can lead to an error in detecting the resonance frequency, and thus a rotation sensing error. Intensity modulation can cause an apparent asymmetry in the resonance lineshape. However, when the heterodyne modulation frequency is set to an odd multiple of a half free spectral range, the resonance detection error due to corresponding sidebands having different amplitudes will be zero. For example, if the average frequency of the sidebands of an optical signal are located at a resonance peak for the resonator 154 and the laser carrier and sideband frequencies are shifted up or down in frequency (which occurs when the common modulation 104 is applied to the laser beam), the magnitude of the sidebands transmitted through the resonator 154 will decrease by equal amounts on either side of the resonance frequency, regardless of any differences between the amplitudes of the sideband signals. Therefore there is no apparent lineshape asymmetry and no resulting resonance detection error. Also, as the sidebands are at different locations on a frequency spectrum, the sidebands can be used to discriminate a particular signal as it propagates within the resonator 154.

Figure 2:
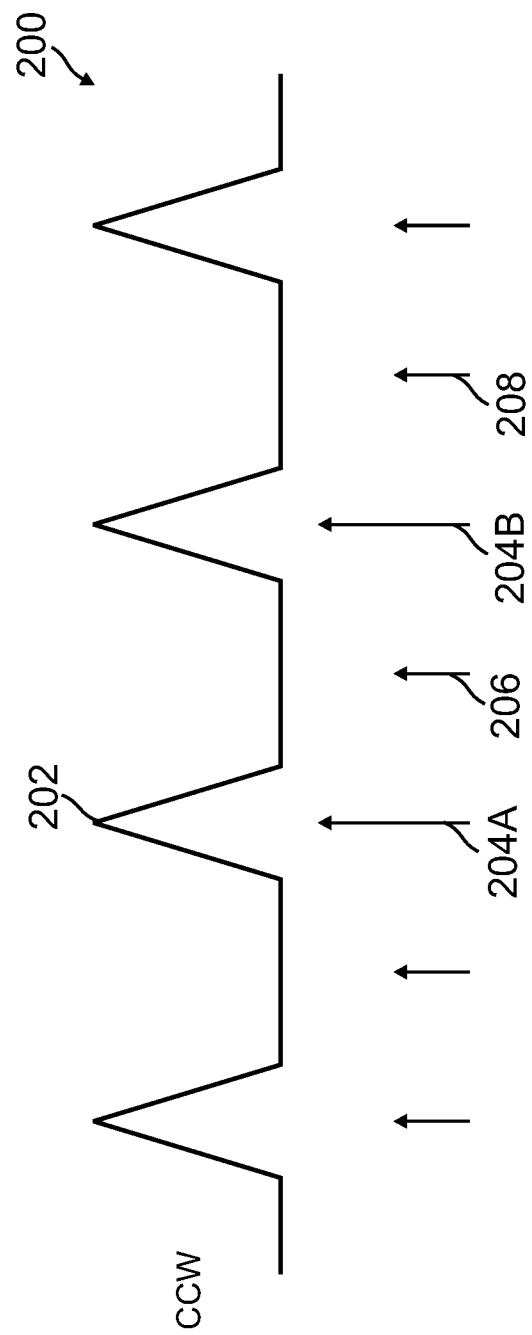
FIG. 2 is a diagram illustrating different sideband signals formed about a carrier frequency in one embodiment described in the present disclosure.

Second harmonic distortion of the heterodyne modulation can also lead to resonance detection errors and thus rotation sensing errors. Second harmonic distortion will cause the even sidebands having the same order to have different magnitudes. If the even sidebands are on or very near a resonance peak, the harmonic distortion can lead to an apparent lineshape asymmetry and thus an error in resonance frequency detection. By setting the heterodyne modulation frequency to exactly an odd multiple of a half free spectral range, the error from harmonic distortion is zero. However, in practice the heterodyne modulation frequency cannot be set exactly at an odd multiple of a half free spectral range, but only to within some tolerance set by the limitations of the device. A further reduction in second harmonic induced errors can be realized by setting the laser carrier and even sidebands off resonance, so the carrier, even sidebands and errors associated with the carrier and even sidebands are not transmitted through the resonator. FIG. 2 is a diagram illustrating different sideband signals formed about a carrier frequency 206 in relation to the frequency response 200 for a resonator. The frequency response 200 includes multiple resonance peaks 202. Each resonance peak 202 is separated from adjacent resonance peaks by a frequency difference that is equal to the free spectral range for a resonator. As illustrated, the carrier frequency 206 is located at a frequency that is half of a free spectral range away from adjacent resonance peaks. Because the carrier frequency 206 is not located at a resonance peak, the carrier frequency is unable to resonate within the resonator. Modulation at a frequency equal to half of the free spectral range creates sideband signals 204A and 204B that are located at resonance peaks 202. Also, the modulation creates other higher order harmonic signals 208 that are located at further multiples of half a free spectral range away from the carrier frequency 206. Some of the higher order harmonic signals 208 correspond to other resonance peaks, however, the higher order harmonic signals 208 have smaller amplitudes than the first order harmonic sideband signals 204A and 204B. Because the carrier frequency 206 fails to resonate within the resonator, the sideband signals 204A and 204B are used to detect the resonance frequency of resonant coil 154 and to adjust the frequency of the carrier frequency 206 to keep the sidebands signals 204A and 204B on resonance.

Figure 3:
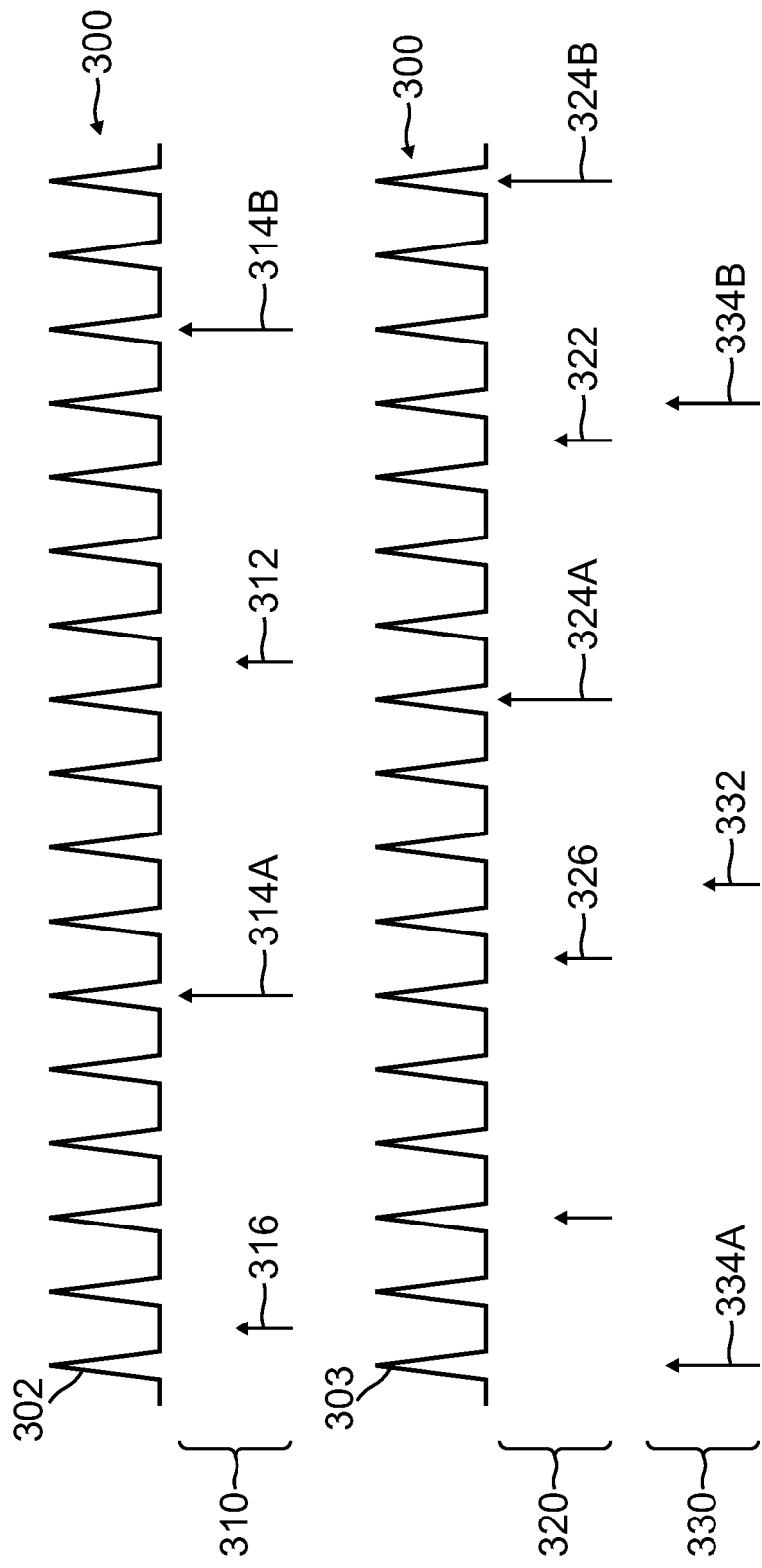
FIG. 3 is a diagram illustrating multiple sideband signals formed about multiple carrier frequencies in one embodiment described in the present disclosure.

FIG. 3 is a diagram illustrating different sideband signals for three different fields propagating within a resonator, where the resonator has a frequency response 300 having multiple CW resonance peaks 302 and CCW resonance peaks 303 that are separated by a free spectral range. As shown, the resonator has three groups of fields propagating within the resonator. A first group 310, a second group 320, and a third group 330. Each group of fields functions like the different fields described above with respect to FIG. 2. Each group has a carrier frequency and harmonic sidebands that are evenly spaced about the carrier frequency. However, the carrier frequency and spacing of each group is different such that at least the low order sidebands for the different groups do not overlap.

In each group, the carrier frequency is located half of a free spectral range away from the most adjacent resonance peak. As illustrated, first carrier frequency 312 of the first group 310, second carrier frequency 322 of the second group 320, and third carrier frequency 332 of the third group 330 are all located half of a free spectral range away from the most adjacent resonance peak and at different frequencies. Further, the first harmonic sideband signals are located an odd multiple of a free spectral range away from a corresponding carrier frequency and the low order harmonic sideband signals do not overlap with other signals propagating within the resonator. For example, in the first group 310, the first order harmonic sideband signals 314A and 314B are located at a frequency where the difference between the carrier frequency 312 and the frequency of the first order harmonic sideband signals 314A and 314B is equal to 4.5 times the free spectral range of the resonator. Similarly, in the second group 320, the first order harmonic sideband signals 324A and 324B are located at a frequency where the difference between the carrier frequency 322 and the frequency of the first order harmonic sideband signals 324A and 324B is equal to 3.5 times the free spectral range of the resonator. In the third group 330, the first order harmonic sideband signals 334A and 334B are located at a frequency where the difference between the carrier frequency 332 and the frequency of the first order harmonic sideband signals 334A and 334B is equal to 6.5 times the free spectral range of the resonator. In certain embodiments, to ensure that the low order harmonic sideband signals for one group of light signals does not overlap with low order harmonic sideband signals, a software tool may be used to identify the different carrier frequencies and the spacing between the harmonic sidebands.

Figure 4:
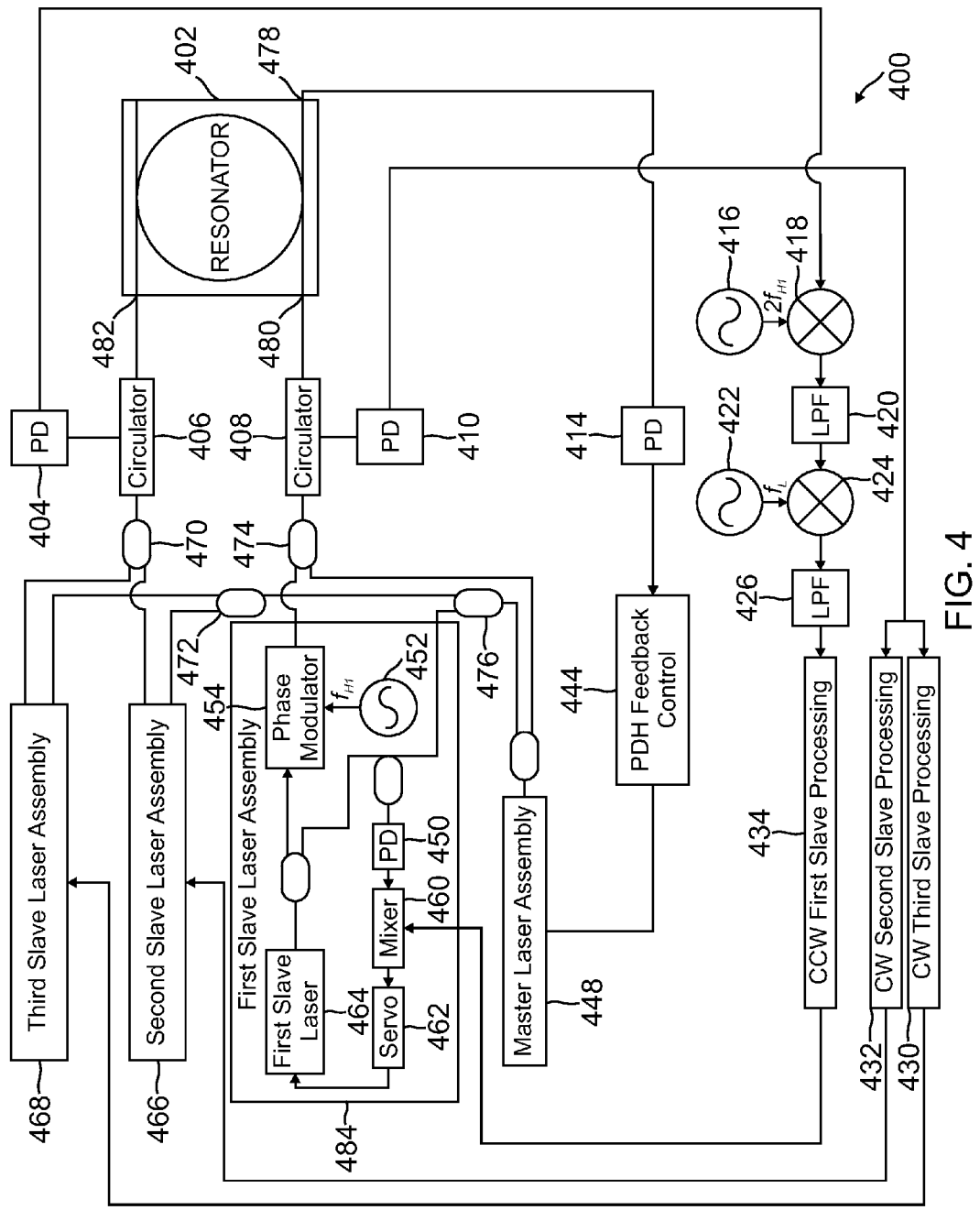
FIG. 4 is a block diagram of a resonator fiber optic gyroscope in one embodiment described in the present disclosure.

FIG. 4 is a block diagram of one embodiment of an RFOG 400 that implements sideband heterodyne detection. As described above, the RFOG 400 may function as a navigation system, a platform stabilization system, a pointing system, and the like. For example, in some embodiments, the RFOG 400 is implemented as part of an inertial sensor unit that includes one or more RFOGs and one or more linear accelerometers. The RFOG 400 measures rotation rate and outputs a signal indicative of rotation rate. The measured rotation rate from the RFOG 400 may be used to calculate parameters such as position, orientation, and angular velocity. The calculated parameters, in some embodiments, may be used to calculate control signals that are outputted to one or more optional actuators.

Further, in at least one implementation, the RFOG 400 includes transmission and reflection mode feedback control. A field from a laser source circulates through the resonator 402. The light is coupled into the resonator 402 at ports 482 and 480 so that light can propagate within the resonator 402. In at least one implementation, the ports 482 and 480 include a mirror, a fiber optic coupler, waveguide, or other suitable component for coupling light into the resonator 402. In at least one embodiment, each of ports 482 and 480 function as both an input port and an output port. For example, the port 480 couples the light into the resonator 402 in a first direction (e.g., counter-clockwise). Light coupled into the resonator 402 has a "transmission port" and a "reflection port". In general, all the light detected at the transmission port has propagated through the resonator, whereas at the reflection port there is combination of the portion of the resonator incident light that did not enter the resonator and light that has propagated through the resonator. For example, the port 480 also functions as the transmission port for the light coupled into the resonator 402 through the port 482 and the port 482 functions as the transmission port for the light coupled into the resonator 402 through the port 480. Port 478 functions as a reflection port for light coupled into the resonator 402 through port 480.

In certain implementations, light that is coupled into the resonator 402 is frequency stabilized using the resonator 402 with feedback control based on light acquired from the ports 480 and 482. Further, in certain implementations where a light produced by a master laser assembly 448 is used to further stabilize the frequency of the light propagating within the resonator 402, light can also be acquired through a master reflection port 478. Using feedback control can stabilize the fields that propagate within the resonator 402 at both high and low frequencies. In at least one implementation, feedback control may reduce phase noise using the Pound-Drever-Hall (PDH) technique. A laser source with PDH feedback control receives a signal from a PDH photo-detector 414 that senses light from the reflection port 478 associated with a master laser assembly 448. The resonator response to changes in relative frequency between the laser and resonator is much faster at the reflection port than the transmission port. To stabilize the master laser 448 and thus reduce the phase noise of the master laser 448, the master laser 448 is locked onto a CCW resonance of resonator 402 by using a PDH feedback control. Typically, the resonance lineshape at the reflection port has significantly more asymmetry than the resonance lineshape at the transmission port. The significantly larger asymmetry in the reflection port lineshape results in bias errors and low frequency drift errors in the relative frequency between the master laser 448 and the resonator 402. Since changes in lineshape asymmetry are driven mostly by thermal effects, the frequency drift error are typically at relatively low frequencies (e.g. much less than 10 Hz). The bias errors and low frequency drift errors can be corrected by using the transmission ports to lock the slave lasers to the resonator. The low relative frequency noise between the master laser 448 and resonator 402 is transferred to the slave lasers 466, 468 and 484 by employing phase lock loops that lock the slave lasers to the master laser. To lock the slave lasers 466, 468 and 484 to corresponding resonance frequencies of resonator 402, transmission mode feedback control is used to lock the sidebands of the lasers to resonance centers (also referred to herein as simply "resonance") of the resonator 402. Each laser that is slaved to the light produced by the master laser 448 has an associated feedback control that receives a signal from a photo-detector associated with a particular transmission port. For example, when the RFOG 400 has a first, second, and third slave laser; the first slave laser propagates in the CCW direction in the resonator 402 and the second and third slave lasers propagate in the CW direction. The lasers that propagate in the CW direction couple out of the resonator 402 and are circulated toward the photo-detector 410, where the photo-detector 410 provides a signal to the feedback control for the lasers that propagate in the CW direction. Similarly, the lasers that propagate in the CCW direction couple out of the resonator 402 and are circulated toward the photo-detector 404, where the photo-detector 404 provides a signal to the feedback control for the lasers that propagate in the CCW direction. Accordingly, PDH feedback control can reduce phase noise at higher frequencies (e.g. above 10 Hz), and feedback control can correct for drift (e.g., bias) errors.

In certain implementations, where a light produced by a master laser assembly 448 is controlled through PDH feedback, the output of the master laser assembly 448 is coupled into multiple slave laser assemblies 484, 466, and 468 through couplers 476 and 472. Further, the output of the master laser assembly 448 is coupled into the resonator 402 through coupler 474. The master laser assembly 448 is configured to generate light for circulation within the resonator 402. The light produced by the master laser assembly 448 receives PDH feedback for locking the frequency of the light from the master laser assembly 448 to the resonator 402 resonance frequency detected at resonance port 478 of the resonator 402. The PDH feedback control is coupled to the master laser assembly 448 and is configured to frequency modulate the light from the master laser assembly 448 with a PDH modulation signal. In an example, the PDH modulation signal is a sine wave signal having a frequency within the range of 1-100 MHz. The PDH feedback control is also coupled to the resonator 402 and is configured to sense light from the port 478 of the resonator 402 and to demodulate the light based on the PDH modulation signal. Based on this demodulation, the PDH feedback control generates a PDH error signal for adjusting the frequency of the light from the master laser assembly 448 toward resonance of the resonator 402 at the port 478. Since the light from the master laser assembly 448 is frequency modulated, the PDH error signal is configured to adjust the value of a time-averaged frequency of the light.

As illustrated, the RFOG 400 includes at least one slave laser that is locked to the light produced by the master laser assembly 448 with PDH feedback control. Locking a slave laser to the light produced by the master laser assembly 448 provides the slave laser with the frequency noise reduction of the PDH feedback control. By using this master-slave set-up, there are at least two ways to apply common modulation to the slave laser for detecting the resonance frequencies at the transmission ports. One method is to add a modulation to the PDH error signal, which modulate the lock point of the master laser relative to the resonance frequency of the resonator 402. Since the slave lasers are phase locked to the master laser, the slave laser frequency will also modulate relative to the resonance frequencies of the resonator. One drawback to this method is that non-linearity of the PDH error signal can cause modulation distortion which can lead to rotation sensing errors. Another method to apply common frequency modulation to the slave lasers is to modulate the phase of the master light used to lock the slave lasers to the master. Using a master-slave set-up can reduce the modulation distortion by separating the PDH error signal and the transmission mode modulation signal. The PDH error signal controls the master laser 448 and the transmission mode modulation signal modulates the slave lasers.

As described above, the light produced by the master laser assembly 448 is locked to resonance of the resonator 402 at the reflection port using PDH feedback control. The slave lasers (such as first slave laser 464) are locked to the light produced by the master laser assembly 448 with an optical phase lock loop (PLL). The PLL provides a slave laser with the low resonator relative frequency noise qualities of the PDH controlled master laser assembly 448. In one implementation, light from the master laser assembly 448 is coupled via a coupler 476 to the first slave laser 464 for locking thereto. The first slave laser 464 is set such that (notwithstanding the transmission mode adjustment signal discussed below) there is a constant frequency difference between the light produced by the master laser assembly 448 and the first slave laser 464. The frequency difference does not vary based on changes in the light produced by the master laser assembly 448, slave laser 464, or resonator 402 during operation. The frequency difference is set before or during initial operation of the RFOG 400 based on the resonance modes of the resonator 402. In particular, with the light produced by the master laser assembly 448 set to a given resonance mode of the resonator 402, the frequency difference is set such that the sidebands of the slave laser 464 are at a different resonance mode of the resonator 402.

The frequency difference is set by frequency difference signals from transmission mode feedback control to the slaver lasers. In one implementation, the frequency difference is determined by a stable frequency source such as a direct digital synthesizer (DDS). Accordingly, the master laser assembly 448 outputs light about a first frequency and the first slave laser 464 outputs light about a second frequency separated from the first frequency by the frequency difference. The frequencies of both the light produced by the master laser assembly 448 and the slave laser 464 are modulated and vary accordingly. Further, feedback control (implemented within the CCW first slave processing 434) provides a transmission mode adjustment signal to adjust the (average) frequency of the light from the first slave laser 464. The transmission mode adjustment signal comprises an adjustment to the frequency of the first slave laser 464 based on a resonance tracking error signal at the port 482 of the resonator 402. In particular, the adjustment signal from the CCW first slave processing 434 locks the sidebands of the first slave laser 464 onto resonance detected at the transmission port 424. Accordingly, the adjustment varies over time based on variations in the sidebands of the first slave laser 464 and the resonator 402.

The CCW first slave processing 434 provides a composite signal to the first slave laser 464 that includes the frequency difference between the first slave laser 464 and the light produced by the master laser assembly 448, and the transmission mode adjustment signal. The composite signal from the CCW first slave processing 434 causes the first slave laser 464 to be set to an average frequency equal to the frequency difference plus the transmission mode adjustment signal. The transmission mode adjustment signal can keep the first order sidebands of first slave laser 464 on resonance of the resonator 402 by adjusting the relative frequency between the master laser the slave laser 464. The combination of locking the first slave laser 464 to the light produced by the master laser assembly 448 with PDH feedback control and locking the frequency of the first slave laser 464 with signals from the CCW first slave processing 434 provides the first slave laser 464 with both low frequency noise relative to the resonator within the bandwidth of the PDH feedback control and low frequency drift relative to the resonator. The light from the first slave laser 464 can then be used for accurate rotation measurements. As with the first slave laser 464, the light produced by the second slave laser assembly 466 and the third slave laser assembly 468 is also locked to the light produced by the master laser assembly 448. Further, the light from the second slave laser assembly 466 and the third slave laser assembly 468 is also respectively adjusted by signals produced by the CW second slave processing 432 and the CW third slave processing 430.

In certain implementations, the light produced by the first slave laser assembly 484, the second slave laser assembly 466, and the third slave laser assembly 468 in conjunction with feedback control enables the slave lasers within the slave laser assemblies to be locked onto the resonant peaks of the resonator 402 (by locking the modulation induced first order sidebands to the resonance frequencies of the resonator 402) to reduce relative frequency drift and jitter between the slave lasers and the resonator 106. This can improve gyroscope performance with laser having phase noise and in vibration environments.

The slave lasers within the slave laser assemblies 484, 466, 468 used for rotation sensing in the RFOG 400 achieve transmission and reflection mode feedback control using a master-slave set-up, where light produced from the first slave laser assembly 484 circulates in a first direction through the resonator 402 and light produced from the second slave laser assembly 466 counter-propagates with the first slave laser in a second direction through the resonator 402. Further, light from a third slave laser assembly 468 is also coupled into the resonator 402 to counter-propagate with the light from the first slave laser assembly 484 in a second direction through the resonator 106. In at least one example, the first, second, and third slave laser assemblies 484, 466, and 468 include similar components. FIG. 4 illustrates the components of the first slave laser assembly 484; the second and third slave laser assemblies 466, 468 may include similar components.

Each of the slave laser assemblies 484, 466, 468 is stabilized with transmission and reflection mode feedback from the resonator 402. That is, each of the slave laser assemblies 484, 466, 468 is controlled based on feedback from the resonator 402 that is used for rotation sensing. By using the same resonator 402 for rotation sensing and for transmission and reflection mode feedback, as opposed to using a separate reference resonator to stabilize the lasers, the relative frequency noise between the lasers produced by the slave laser assemblies 484, 466, 468 and the gyroscope resonator 402 is reduced which can improve performance of the RFOG 400.

The reflection mode feedback to reduce frequency noise of the light produced by the slave laser assemblies 484, 466, and 468 is achieved by locking the light from each of the slave laser assemblies 484, 466, and 468 to light produced by a master laser assembly 448, which is locked to the gyro resonator 402 with PDH feedback control 444. Accordingly, the light produced by the master laser assembly 448 can be locked to resonance of the resonator 402 at the port 478. Various embodiments for implementing PDH feedback control 444 are disclosed in U.S. patent application Ser. No. 13/571,887 titled "LASER WITH TRANSMISSION AND REFLECTION MODE FEEDBACK CONTROL" filed Aug. 10, 2012, which is herein incorporated by reference. Accordingly, the PDH feedback control 444 is configured to adjust light produced by the master laser assembly 448 to lock the light produced by the master laser assembly 448 to the resonance detected at the reflection port 478 of the resonator 402 and to control the master laser assembly 448 to achieve the PDH modulation of the reference light produced by the master laser 448. In certain implementations, the reference light from the master laser assembly 448 is coupled to circulate in the same direction through the resonator 402 as the first slave light from the first slave laser assembly 484.

The reference light from the master laser assembly 448 is also sent to each of the slave laser assemblies 484, 466, and 468 for locking thereto. The light produced by each of the slave lasers 484, 466, and 468 is locked to light produced by the master laser assembly 448 such that there is a constant frequency difference between the light produced by the master laser assembly 448 and the light produced by each slave laser assembly 484, 466, and 468. Further, each slave laser assembly 484, 466, and 468 produces light that has a different constant frequency difference from the light produced by the master laser assembly 448 and, as such, each slave laser assembly 484, 466, and 468 produces light at a frequency that is distinct from the light produced by the other slave laser assemblies 484, 466, and 468. More detail regarding the light produced by the slave laser assemblies 484, 466, and 468 is provided below. Each of the slave laser assemblies 484, 466, and 468 can be locked to the light produced by the master laser 448 with an optical PLL. Accordingly, the light produced by each of the slave lasers 484, 466, and 468 can achieve low frequency noise with respect to the resonator 402 based on PDH techniques.

As described above in relation to FIG. 1-3, light produced by the slave laser assemblies 484, 466, and 468 includes a phase modulator to create sidebands for a field having a particular frequency that is between resonance peaks of the resonator 402, such that the modulation of the field creates first order harmonic sideband signals that are located on resonance peaks of the resonator 402. For example, the first slave laser 464 in the first slave assembly 484 provides a light having a frequency that is half of a free spectral range from a resonance peak of the resonator 402. The light from the first slave laser 464 is provided to the first heterodyne modulator 454. The first heterodyne modulator 454 phase modulates the light from the first slave laser 464 with a signal from the first heterodyne signal source 452, where the first heterodyne signal produces a high frequency signal that is equal to a odd multiple of a half free spectral range for the resonator 402. The first heterodyne modulator 454 produces a signal having first harmonic sidebands at frequencies corresponding to resonance peaks of the resonator 402. Likewise, the second and third slave laser assemblies 466 and 468 also produce fields having sidebands at frequencies corresponding to resonance peaks of the resonator 402. As explained above with respect to FIG. 3, the sidebands produced by each slave laser assembly are at different resonant peaks for the resonator 402.

In certain embodiments, the light produced by the slave laser assemblies 484, 466, and 468 is also controlled to lock onto resonance detected at respective transmission ports 482 and 480 of the resonator 402. The light produced by the slave laser assemblies 484, 466, and 468 are locked onto resonance detected at their respective transmission ports by the transmission mode feedback control. The transmission mode feedback control may include components that demodulate the signals produced by the photo-detectors 410 and 404 as described above with respect to FIG. 1. In particular, the signal produced in response to the light detected at the photodetectors 410 and 404 is demodulated by a heterodyne demodulator 418 at twice the heterodyne modulation frequency provided by the oscillating signal source 416. In certain implementations, the heterodyne frequency is monitored and adjusted through monitoring the light received at the resonance ports. Further, in certain implementations, the signals are also demodulated by a demodulator 424 according to a common modulation frequency that corresponds with the modulation produced by locking the light produced by the slave laser assemblies 484, 466, and 468 to the light produced by the master slave assembly 448. In at least one implementation, after each demodulation, the signals are filtered by a low pass filter. When the signals are filtered and demodulated, the signals are passed to slave processing that provides a signal to lock the light produced by the slave laser assemblies 484, 466, and 468 to a transmission port resonance signal of the resonator 402. For example, the sideband signals produced by the first slave laser assembly propagate within the resonator 402 in a CCW direction and then are transmitted out of the resonator through port 482. The sidebands are detected by the photodetector 404, which provides a signal to the demodulators 418 and 424, which demodulates the signal for the CCW first slave processing 434. The CCW first slave processing 434 provides a frequency signal to a mixer 460 that mixes with the beat signal generate by interference between the light produced by the first slave laser 464 and the light received from the master laser assembly 448. The mixer 460 passes an error signal through a servo 462, which then adjusts the light produced by the first slave laser 464 such that the beat signal between the slave laser 464 and the master laser 448 have the same frequency as the frequency signal from slave processing 434. Slave processing 434 adjusts the frequency signal to mixer 460 to adjust the light produced by the first laser 464 so that the first order heterodyne modulation sidebands of laser 464 are on resonance peaks of resonator 402. Similarly, the CW second slave processing 432 demodulates signals received from the transmission port 480 to lock the sideband fields produced by the second laser assembly 466 to resonance peaks of the resonator 402. Also the CW third slave processing 430 demodulates signals received from the transmission port 480 to lock the sideband fields produced by the third laser assembly 468 to resonance peaks of the resonator 402.

Figure 5:
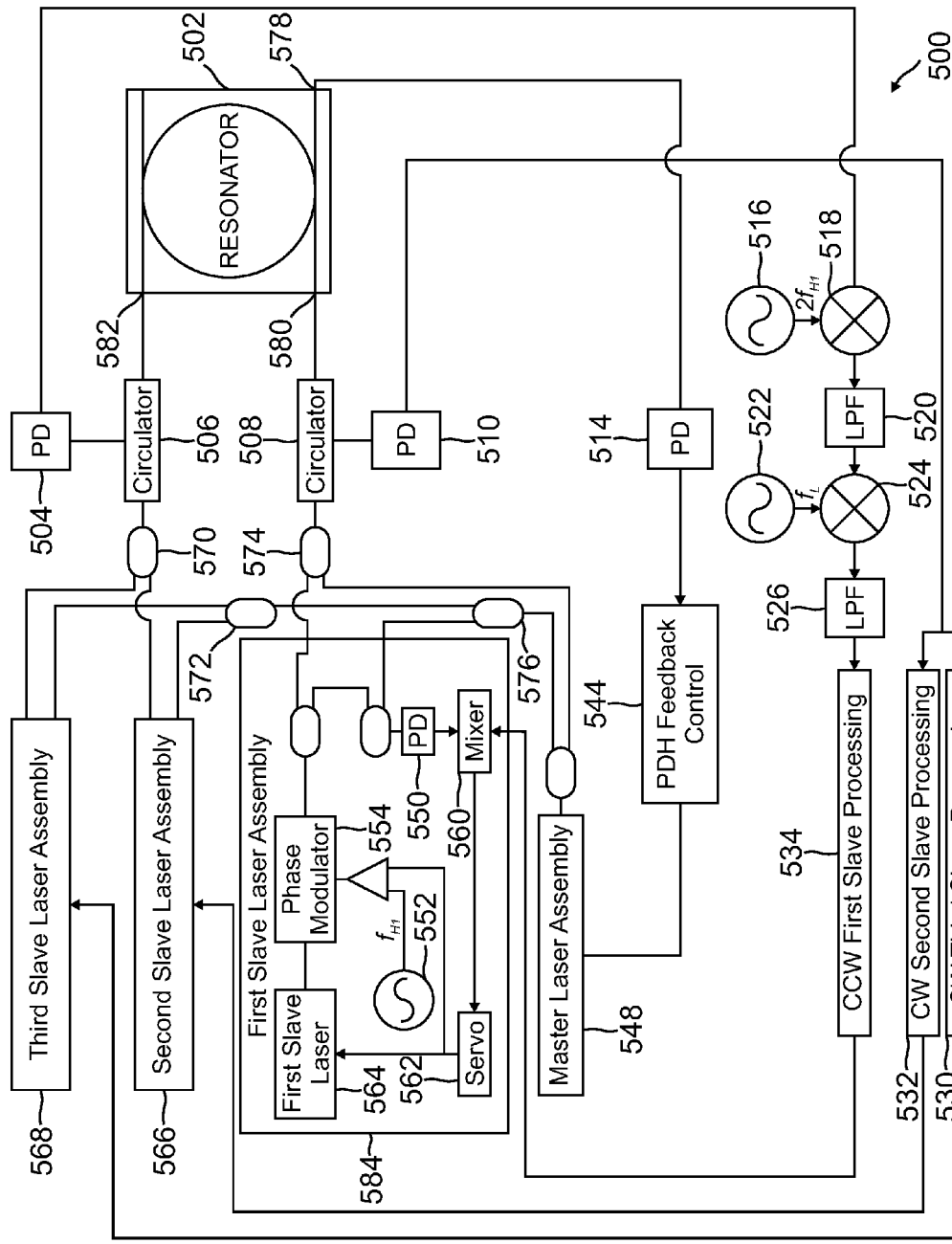
FIG. 5 is a block diagram of a resonator fiber optic gyroscope in one embodiment described in the present disclosure.

FIG. 5 is a block diagram of one embodiment of an RFOG 500 that implements sideband heterodyne detection. RFOG 500 is substantially similar to RFOG 400 in FIG. 4 with the exception of the slave laser assemblies. For example, a first slave laser assembly 584 includes a first slave laser 564. In certain implementations, the first slave laser 564 produces a first slave laser beam having a frequency that is a half free spectral range away from a resonance peak. The first slave laser beam is modulated by a heterodyne phase modulator 554 at a first heterodyne frequency 552 to produce sidebands that are located at resonance peaks of the resonator 502. The heterodyne phase modulator 554 is also used to provide a high frequency feedback control for the optical phase lock loop. The servo 562 provides two control signals to control the frequency of the light from first laser 564. The control signal going to slave laser 564 controls the slave laser frequency from DC to some frequency limited by the bandwidth of the control loop. Typically, the bandwidth is limited by the frequency response of the laser. To increase the overall bandwidth of the frequency control of the laser 564 frequency, another feedback control signal is sent from servo 562 to a phase modulator 554, which can have a faster frequency response than the laser 564. However, the phase modulator 554 has no gain at DC, thus can only provide frequency control at higher frequencies. To adjust the frequency of the first slave laser beam, such that the sidebands stay on the resonance peaks of the resonator 502, the CCW slave processing 534 adjusts a frequency signal to mixer 560, which in turn causes the servo 562 to adjust the average frequency of the first slave laser beam. As described above, in relation to FIG. 4, the servo 562 receives inputs from mixer 560, where the mixer 560 receives inputs from the master laser assembly 548, the processing result from CCW first slave processing 534, and inputs from slave laser 564. The heterodyne modulation frequency is set higher than the bandwidth of the optical phase lock loop, therefore servo 562 does not respond to the heterodyne modulation imposed on the slave laser light. The servo 562 uses the combination of these signals to adjust the carrier frequency of the first laser beam.

Figure 6:
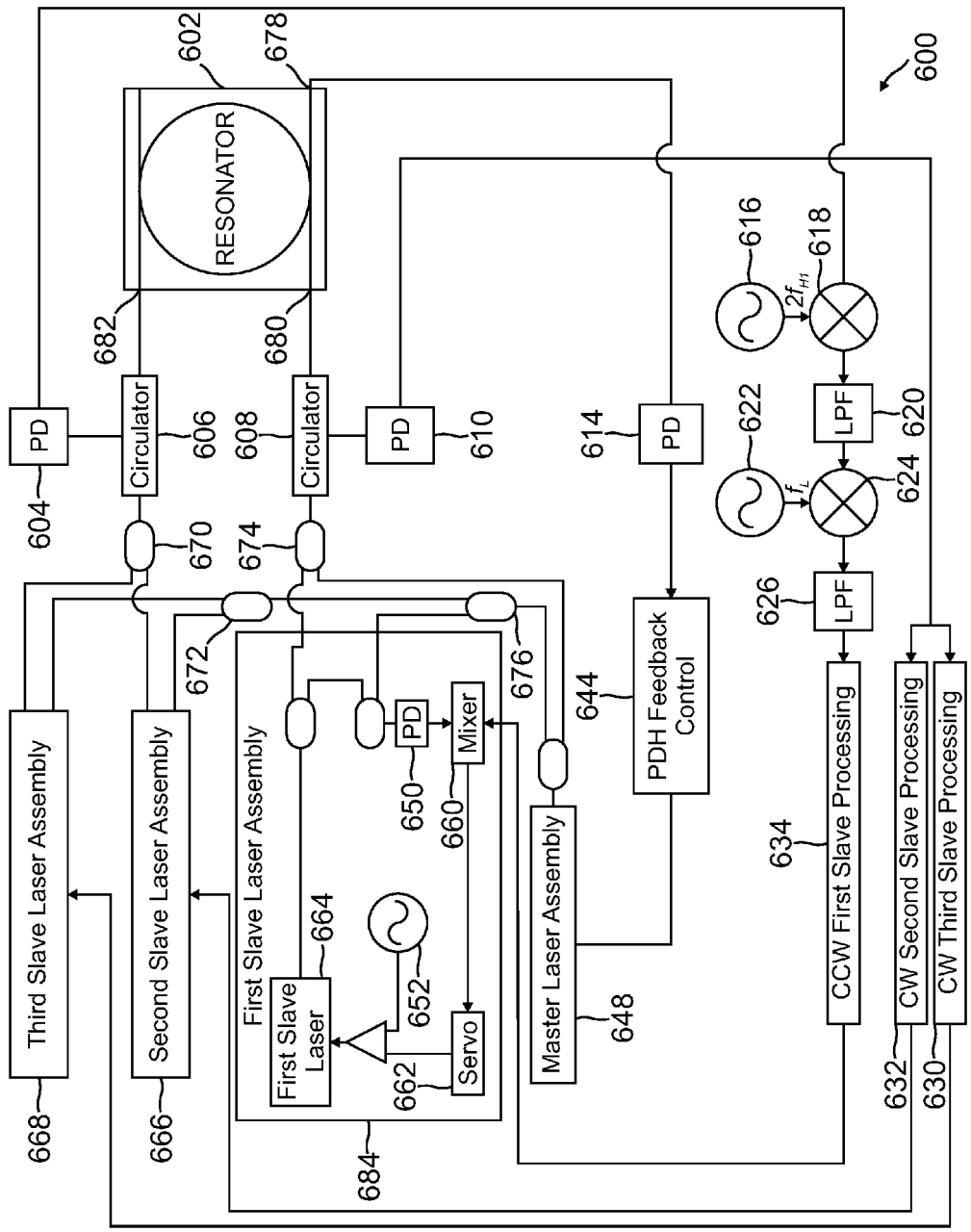
FIG. 6 is a block diagram of a resonator fiber optic gyroscope in one embodiment described in the present disclosure.

FIG. 6 is a block diagram of one embodiment of an RFOG 600 that implements sideband heterodyne detection. RFOG 600 is substantially similar to RFOG 500 in FIG. 5 with the exception of the slave laser assemblies. For example, a first slave laser assembly 684 includes a first slave laser 664. In certain implementations, the first slave laser 664 produces a first slave laser beam having a frequency that is a half free spectral range away from a resonance peak. There is no phase modulator used to provide the heterodyne modulation or to provide high frequency feedback control for the optical phase lock loop. Instead, the feedback of the optical phase lock loop goes entirely to the slave laser 664. This can be done if a laser is employed that has sufficient frequency modulation bandwidth, such as semiconductor based lasers. The heterodyne modulation from heterodyne signal source 652 is summed with the servo 662 output feedback signal. This allows heterodyne signal source 652 to apply heterodyne modulation directly to the slave laser 664 to produce sidebands that are located at resonance peaks of the resonator 602. To adjust the frequency of the first slave laser beam, such that the sidebands stay on the resonance peaks of the resonator 602, the CCW slave processing 634 adjusts a frequency signal to mixer 660, which in turn causes the servo 662 to adjust the average frequency of the first slave laser beam. As described above, in relation to FIGS. 4 and 5, the servo 662 receives inputs from mixer 660, where the mixer 660 receives inputs from the master laser assembly 648, the processing result from CCW first slave processing 634, and the and inputs from slave laser 664. The heterodyne modulation frequency is set much higher than the bandwidth of the optical phase lock loop, therefore servo 662 does not respond to the heterodyne modulation imposed on the slave laser light. The servo 662 uses the combination of these signals to adjust the carrier frequency of the first laser beam.

Figure 7:
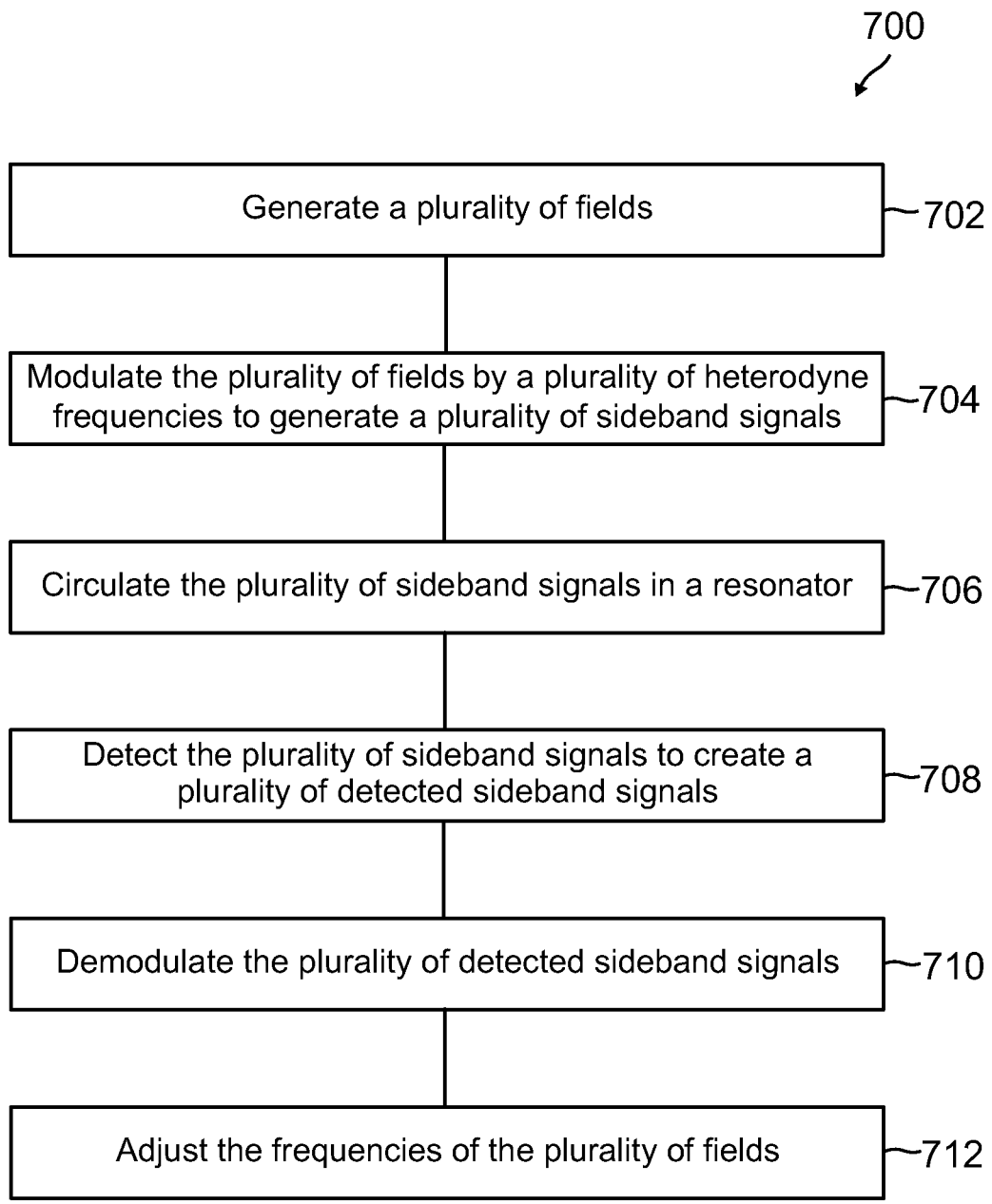
FIG. 7 is a flow diagram of a method that implements sideband heterodyne detection in one embodiment described in the present disclosure.

FIG. 7 is a flow diagram of a method 700 for implementing sideband heterodyne detection in a resonating fiber optic system. Method 700 proceeds at 702 where a plurality of fields are generated. When the plurality of fields are generated, each field is generated at a different frequency that is equal to half of a free spectral range away from a resonance frequency of a resonator. Method 700 proceeds at 704 where the plurality of fields are modulated by a plurality of heterodyne frequencies to generate a plurality of sideband signals. To generate the plurality of sideband signals, each field is modulated at a different frequency that is equal to an odd multiple of half of a free spectral range. The modulation generates sideband signals, where the first order harmonic sideband is located at a resonance frequency for the resonator but does not overlap with a harmonic sideband associated with a different field.

In a further implementation, method 700 proceeds to 706, where the plurality of sideband signals are circulated in the resonator. In certain implementations, the plurality of sideband signals are separated into a group of signals that propagate around the resonator in a CW direction and a group of signals that propagate around the resonator in a CCW direction. Method 700 proceeds to 708, where the plurality of sideband signals is detected to create a plurality of detected sideband signals. For example, the sideband signals that are propagating within the resonator are circulated out of the resonator where they are received by a photodetector. The photodetector then creates the plurality of detected sideband signals from light received out of the resonator.

In at least one embodiment, method 700 proceeds at 710, where the plurality of detected sideband signals is demodulated. For example, the plurality of detected sideband signals is demodulated at a frequency that is equal to twice the heterodyne frequency that was used to produce the sideband signal. Further, the plurality of detected sideband signals may also be demodulated at a common modulation frequency. Method 700 then proceeds to 712 where the frequencies of the plurality of fields are adjusted.

Example Embodiments

Example 1 includes a system comprising: an optical resonator configured to allow light to resonate therein; at least one light source, wherein the light from the at least one light source is controlled to form a plurality of optical fields, wherein each field in the plurality of fields is phase or frequency modulated at a common modulation frequency and each field in the plurality of fields is at a different frequency; a plurality of heterodyne modulators, wherein each heterodyne modulator in the plurality of heterodyne modulators phase or frequency modulates a respective field in the plurality of fields at a respective heterodyne frequency to form a plurality of sidebands, wherein the corresponding heterodyne frequency is different for each heterodyne modulator in the plurality of heterodyne modulators; at least one coupler configured to couple the plurality of sidebands into the optical resonator; and a feedback control coupled to the resonator, wherein the feedback control is configured to detect the plurality of sidebands transmitted out of the resonator to create a plurality of detected sideband signals and adjust frequencies of the plurality of fields based on the plurality of detected sideband signals.

Example 2 includes the system of Example 1, wherein the feedback control demodulates the plurality of detected sideband signals at a respective demodulation frequency of twice the corresponding heterodyne frequency for each of the respective heterodyne frequencies to discriminate between different detected sideband signals in the plurality of detected sideband signals.

Example 3 includes the system of any of Examples 1-2, wherein the feedback control demodulates the plurality of sidebands by the common modulation frequency to determine whether the plurality of sideband signals are at resonant frequencies of the optical resonator.

Example 4 includes the system of any of Examples 1-3, wherein the corresponding heterodyne frequencies and the different frequencies of the plurality of fields are selected such that first order harmonic sidebands in the plurality of sidebands are located at different resonance frequencies for the optical resonator.

Example 5 includes the system of any of Examples 1-4, wherein a field in the plurality of fields is located at half of a free spectral range from a resonance frequency of the optical resonator and the respective heterodyne frequency is substantially equal to an odd multiple of a half free spectral range.

Example 6 includes the system of any of Examples 1-5, wherein the frequencies of the plurality of fields are slave lasers having a frequency that is locked to a reference frequency of a master laser.

Example 7 includes the system of any of Examples 1-6, wherein the plurality of fields are produced by at least one of: frequency shifting the light produced by a single laser to a plurality of different frequencies; and using light produced by a plurality of different lasers.

Example 8 includes a resonator fiber-optic gyroscope comprising: a resonator configured to allow light to resonate therein, wherein the resonator has a plurality of resonant frequencies, each resonant frequency separated by a free spectral range; a first laser to produce a first light having a first frequency; a first heterodyne modulator to phase or frequency modulate the first slave light at a first heterodyne frequency to produce first sideband signals that are located at first sideband resonance frequencies in the plurality of resonance frequencies, wherein the first sideband signals propagate in the resonator in a first direction; a second laser to produce a second light having a second frequency; a second heterodyne modulator to phase or frequency modulate the second light at a second heterodyne frequency to produce second sideband signals that are located at second sideband resonance frequencies in the plurality of resonance frequencies, wherein the second sideband signals propagate in the resonator in a second direction that is opposite to the first direction; a first feedback control configured to: detect the first sideband signal received from a first port of the resonator to produce a first detected signal; demodulate the first detected signal to form a first demodulated signal; and adjust the first frequency such that the first sideband signals move closer to the first sideband resonance frequencies based on the first demodulated signal; and a second feedback control configured to: detect the second sideband signal received from a second port of the resonator to produce a second detected signal; demodulate the second detected signal to form a second demodulated signal; and adjust the second frequency such that the second sideband signals move closer to the second sideband resonance frequencies based on the second demodulated signal.

Example 9 includes the resonator fiber-optic gyroscope of Example 8, wherein the first feedback control demodulates the first detected signal by demodulating the first detected signal at a first demodulation frequency, wherein the first demodulation frequency is two times the first heterodyne frequency.

Example 10 includes the resonator fiber-optic gyroscope of any of Examples 8-9, further comprising: a third laser to produce a third light having a third frequency; a third heterodyne modulator to phase or frequency modulate the third light at a third heterodyne frequency to produce third sideband signals that are located at third sideband resonance frequencies in the plurality of resonance frequencies, wherein the third sideband signals propagate in the resonator in the second direction; a third feedback control configured to: detect the third sideband signal received from a third port of the resonator to produce a third detected signal; demodulate the third detected signal to form a third demodulated signal; and adjust the third frequency such that the third sideband signals move closer to the third sideband resonance frequencies based on the third demodulated signal.

Example 11 includes the resonator fiber-optic gyroscope of any of Examples 8-10, wherein the first frequency, the second frequency, the first heterodyne frequency, and the second heterodyne frequency are selected such that the first sideband resonance frequencies are different from the second sideband resonance frequencies.

Example 12 includes the resonator fiber-optic gyroscope of any of Examples 8-11, wherein the first light and the second light are modulated by a common frequency.

Example 13 includes the resonator fiber-optic gyroscope of Example 12, wherein the first detected signal and the second detected signal are demodulated by the common frequency.

Example 14 includes the resonator fiber-optic gyroscope of any of Examples 8-13, further comprising a reference laser configured to produce a reference laser beam having a reference frequency, wherein the reference laser beam circulates through the resonator in a first direction, wherein the first frequency and the second frequency are locked to the reference frequency.

Example 15 includes the resonator fiber-optic gyroscope of Example 14, wherein the first frequency of the first light is half of the free spectral range from a first resonance frequency in the plurality of resonant frequencies; wherein the first heterodyne frequency is substantially equal to an odd multiple of half of the free spectral range; wherein the second frequency of the second light is half of the free spectral range from a second resonance frequency in the plurality of resonant frequencies; and wherein the second heterodyne frequency is substantially equal to an odd multiple of half of the free spectral range.

Example 16 includes the resonant fiber-optic gyroscope of any of Examples 8-15, wherein the first sideband signals comprise first order harmonic sidebands of the first frequency modulated at the first heterodyne frequency and the second sideband signals comprise first order harmonic sidebands of the second frequency modulated at the second heterodyne frequency.

Example 17 includes a method for monitoring rotation, the method comprising: generating a plurality of fields; modulating the plurality of fields by a plurality of heterodyne frequencies to generate a plurality of sideband signals; circulating the plurality of sideband signals in the resonator; detecting the plurality of sideband signals at at least one port of the resonator to create a plurality of detected sideband signals; demodulating the plurality of detected sideband signals; and adjusting the frequencies of the plurality of fields, wherein adjusting the frequencies moves sideband frequencies for the plurality of sideband signals toward resonance peaks of the resonator.

Example 18 includes the method of Example 17, wherein demodulating the plurality of detected sideband signals comprises: demodulating at least one detected sideband signal at twice a corresponding heterodyne frequency to discriminate each detected sideband signal in the plurality of detected sideband signals; demodulating the at least one detected sideband signal at a common modulation frequency to identify resonance errors.

Example 19 includes the method of any of Examples 17-18, further comprising modulating the plurality of fields by a common modulation frequency.

Example 20 includes the method of any of Examples 17-19, wherein the plurality of fields are at frequencies that are referenced against a reference frequency of a master laser.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
   an optical resonator configured to allow light to resonate therein;
   at least one light source, wherein the light from the at least one light source is controlled to form a plurality of optical fields, wherein each field in the plurality of fields is phase or frequency modulated at a common modulation frequency and each field in the plurality of fields is at a different frequency;
   a plurality of heterodyne modulators, wherein each heterodyne modulator in the plurality of heterodyne modulators phase or frequency modulates a respective field in the plurality of fields at a respective heterodyne frequency to form a plurality of sidebands, wherein the corresponding heterodyne frequency is different for each heterodyne modulator in the plurality of heterodyne modulators;
   at least one coupler configured to couple the plurality of sidebands into the optical resonator; and
   a feedback control coupled to the resonator, wherein the feedback control is configured to detect the plurality of sidebands transmitted out of the resonator to create a plurality of detected sideband signals and adjust frequencies of the plurality of fields based on the plurality of detected sideband signals.

2. The system of claim 1, wherein the feedback control demodulates the plurality of detected sideband signals at a respective demodulation frequency of twice the corresponding heterodyne frequency for each of the respective heterodyne frequencies to discriminate between different detected sideband signals in the plurality of detected sideband signals.

3. The system of claim 1, wherein the feedback control demodulates the plurality of sidebands by the common modulation frequency to determine whether the plurality of sideband signals are at resonant frequencies of the optical resonator.

4. The system of claim 1, wherein the corresponding heterodyne frequencies and the different frequencies of the plurality of fields are selected such that first order harmonic sidebands in the plurality of sidebands are located at different resonance frequencies for the optical resonator.

5. The system of claim 1, wherein a field in the plurality of fields is located at half of a free spectral range from a resonance frequency of the optical resonator and the respective heterodyne frequency is substantially equal to an odd multiple of a half free spectral range.

6. The system of claim 1, wherein the frequencies of the plurality of fields are slave lasers having a frequency that is locked to a reference frequency of a master laser.

7. The system of claim 1, wherein the plurality of fields are produced by at least one of:
   frequency shifting the light produced by a single laser to a plurality of different frequencies; and
   using light produced by a plurality of different lasers.

8. A resonator fiber-optic gyroscope comprising:
   a resonator configured to allow light to resonate therein, wherein the resonator has a plurality of resonant frequencies, each resonant frequency separated by a free spectral range;
   a first laser to produce a first light having a first frequency;
   a first heterodyne modulator to phase or frequency modulate the first slave light at a first heterodyne frequency to produce first sideband signals that are located at first sideband resonance frequencies in the plurality of resonance frequencies, wherein the first sideband signals propagate in the resonator in a first direction;
   a second laser to produce a second light having a second frequency;
   a second heterodyne modulator to phase or frequency modulate the second light at a second heterodyne frequency to produce second sideband signals that are located at second sideband resonance frequencies in the plurality of resonance frequencies, wherein the second sideband signals propagate in the resonator in a second direction that is opposite to the first direction;
   a first feedback control configured to:
      detect the first sideband signal received from a first port of the resonator to produce a first detected signal;
      demodulate the first detected signal to form a first demodulated signal; and
      adjust the first frequency such that the first sideband signals move closer to the first sideband resonance frequencies based on the first demodulated signal; and
   a second feedback control configured to:
      detect the second sideband signal received from a second port of the resonator to produce a second detected signal;
      demodulate the second detected signal to form a second demodulated signal; and
      adjust the second frequency such that the second sideband signals move closer to the second sideband resonance frequencies based on the second demodulated signal.

9. The resonator fiber-optic gyroscope of claim 8, wherein the first feedback control demodulates the first detected signal by demodulating the first detected signal at a first demodulation frequency, wherein the first demodulation frequency is two times the first heterodyne frequency.

10. The resonator fiber-optic gyroscope of claim 8, further comprising:
a third laser to produce a third light having a third frequency;
a third heterodyne modulator to phase or frequency modulate the third light at a third heterodyne frequency to produce third sideband signals that are located at third sideband resonance frequencies in the plurality of resonance frequencies, wherein the third sideband signals propagate in the resonator in the second direction;
a third feedback control configured to:
detect the third sideband signal received from a third port of the resonator to produce a third detected signal;
demodulate the third detected signal to form a third demodulated signal; and
adjust the third frequency such that the third sideband signals move closer to the third sideband resonance frequencies based on the third demodulated signal.

11. The resonator fiber-optic gyroscope of claim 8, wherein the first frequency, the second frequency, the first heterodyne frequency, and the second heterodyne frequency are selected such that the first sideband resonance frequencies are different from the second sideband resonance frequencies.

12. The resonator fiber-optic gyroscope of claim 8, wherein the first light and the second light are modulated by a common frequency.

13. The resonator fiber-optic gyroscope of claim 12, wherein the first detected signal and the second detected signal are demodulated by the common frequency.

14. The resonator fiber-optic gyroscope of claim 8, further comprising a reference laser configured to produce a reference laser beam having a reference frequency, wherein the reference laser beam circulates through the resonator in a first direction, wherein the first frequency and the second frequency are locked to the reference frequency.

15. The resonator fiber-optic gyroscope of claim 14, wherein the first frequency of the first light is half of the free spectral range from a first resonance frequency in the plurality of resonant frequencies;
wherein the first heterodyne frequency is substantially equal to an odd multiple of half of the free spectral range;
wherein the second frequency of the second light is half of the free spectral range from a second resonance frequency in the plurality of resonant frequencies; and
wherein the second heterodyne frequency is substantially equal to an odd multiple of half of the free spectral range.

16. The resonant fiber-optic gyroscope of claim 8, wherein the first sideband signals comprise first order harmonic sidebands of the first frequency modulated at the first heterodyne frequency and the second sideband signals comprise first order harmonic sidebands of the second frequency modulated at the second heterodyne frequency.

17. A method for monitoring rotation, the method comprising:
generating a plurality of fields;
modulating the plurality of fields by a plurality of heterodyne frequencies to generate a plurality of sideband signals;
circulating the plurality of sideband signals in the resonator;
detecting the plurality of sideband signals at at least one port of the resonator to create a plurality of detected sideband signals;
demodulating the plurality of detected sideband signals; and
adjusting the frequencies of the plurality of fields, wherein adjusting the frequencies moves sideband frequencies for the plurality of sideband signals toward resonance peaks of the resonator.

18. The method of claim 17, wherein demodulating the plurality of detected sideband signals comprises:
demodulating at least one detected sideband signal at twice a corresponding heterodyne frequency to discriminate each detected sideband signal in the plurality of detected sideband signals;
demodulating the at least one detected sideband signal at a common modulation frequency to identify resonance errors.

19. The method of claim 17, further comprising modulating the plurality of fields by a common modulation frequency.

20. The method of claim 17, wherein the plurality of fields are at frequencies that are referenced against a reference frequency of a master laser.

\* \* \* \* \*